United States Patent
Li et al.

(10) Patent No.: US 10,460,209 B2
(45) Date of Patent: Oct. 29, 2019

(54) METHOD AND SYSTEM FOR VEHICLE RECOGNITION

(71) Applicant: Beijing ICETech Science & Technology Co., Ltd., Beijing (CN)

(72) Inventors: Zhiguo Li, Beijing (CN); Zhenjie Yang, Beijing (CN); Lei Geng, Beijing (CN); Xuebin Wang, Beijing (CN); Ming Zhu, Beijing (CN)

(73) Assignee: Beijing ICETech Science & Technology Co., Ltd., Beijing (CN)

( * ) Notice: Subject to any disclaimer, the term of this patent is extended or adjusted under 35 U.S.C. 154(b) by 0 days.

(21) Appl. No.: 15/820,499

(22) Filed: Nov. 22, 2017

(65) Prior Publication Data
US 2019/0026603 A1    Jan. 24, 2019

(30) Foreign Application Priority Data
Jul. 19, 2017    (CN) .......................... 2017 1 0589038

(51) Int. Cl.
     *G06K 9/00*        (2006.01)
     *G06K 9/62*        (2006.01)
     *G06K 9/46*        (2006.01)
     *G08G 1/017*      (2006.01)

(52) U.S. Cl.
CPC ....... *G06K 9/6262* (2013.01); *G06K 9/00771* (2013.01); *G06K 9/4628* (2013.01); *G06K 9/4652* (2013.01); *G06K 9/6215* (2013.01); *G06K 9/6292* (2013.01); *G06K 2209/15* (2013.01); *G06K 2209/23* (2013.01); *G08G 1/0175* (2013.01)

(58) Field of Classification Search
None
See application file for complete search history.

(56) References Cited

U.S. PATENT DOCUMENTS

| | | | |
|---|---|---|---|
| 8,620,078 B1* | 12/2013 | Chapleau | G06K 9/344 |
| | | | 382/173 |
| 9,373,033 B2* | 6/2016 | Chan | G06K 9/00536 |
| 9,594,956 B2* | 3/2017 | Cohen | G07B 15/02 |
| 9,731,713 B2* | 8/2017 | Horii | B60W 30/00 |
| 10,081,376 B2* | 9/2018 | Singh | B61L 23/044 |

(Continued)

FOREIGN PATENT DOCUMENTS

| CN | 106599869 A | * | 4/2017 |
|---|---|---|---|
| CN | 106651969 A | * | 5/2017 |

OTHER PUBLICATIONS

Yao et al., "Coupled multivehicle detection and classification with prior objectness measure." IEEE Transactions on Vehicular Technology. Mar. 2017; 66(3): 1975-1984.*

*Primary Examiner* — Feng Niu
(74) *Attorney, Agent, or Firm* — Morgan, Lewis & Bockius LLP

(57) ABSTRACT

The present disclosure relates to a vehicle recognition method and system. The vehicle recognition method comprises: receiving a first image; extracting a first vehicle brand recognition region and a first color recognition region of the first image; recognizing the extracted first vehicle brand recognition region by a trained vehicle brand deep learning model; recognizing the extracted first color recognition region; and recognizing the vehicle based on the recognition results of the first vehicle brand recognition region and the first color recognition region.

12 Claims, 8 Drawing Sheets

(56) References Cited

U.S. PATENT DOCUMENTS

| | | | |
|---|---|---|---|
| 10,152,644 B2* | 12/2018 | Ma | G06K 9/00771 |
| 2011/0057816 A1* | 3/2011 | Noble | G06K 9/325 |
| | | | 340/937 |
| 2016/0148072 A1* | 5/2016 | Chan | G06K 9/00536 |
| | | | 382/104 |
| 2017/0314954 A1* | 11/2017 | Golding | G01C 21/3644 |
| 2017/0323540 A1* | 11/2017 | Boykin | G08B 13/19613 |
| 2018/0060684 A1* | 3/2018 | Ma | G06K 9/00771 |

* cited by examiner

METHOD AND SYSTEM FOR VEHICLE RECOGNITION

CROSS-REFERENCE TO RELATED APPLICATION

This application claims the priority and benefit of Chinese Patent Application No. 201710589038.0 filed on Jul. 19, 2017, which is incorporated herein in its entirety by reference.

TECHNICAL FIELD

This disclosure relates generally to the field of artificial intelligence, and more particularly, to a method and system for vehicle recognition by means of artificial intelligence.

BACKGROUND

With the development of society, vehicles have been daily travel tools. Identification of a vehicle is the license plate. However, if the license plate is lost, covered, or stained; or, if the license plate information cannot be accurately gotten due to distance and weather, it is very difficult for a computer to identify the vehicle. In practice, it usually requires artificial recognition. However, the artificial recognition is not only of low efficiency, but also likely to make mistake due to misjudgment or omission.

SUMMARY

With respect to the problem of existing technologies, the present disclosure proposes a vehicle recognition method, comprising: receiving a first image; extracting a first vehicle brand recognition region and a first color recognition region of the first image; recognizing the extracted first vehicle brand recognition region by a trained vehicle brand deep learning model; recognizing the extracted first color recognition region; and recognizing the vehicle based on the recognition results of the first vehicle brand recognition region and the first color recognition region.

According to the above method, the trained vehicle brand deep learning model is based on convolutional neural network (CNN) model, deep belief network (DBN) model, recurrent neural network (RNN) model, or biological neural network (BNN) model, or combinations thereof.

The above method comprises recognizing the extracted first color recognition region by a trained color deep learning model.

According to one or more of the above method, the trained color deep learning model is based on convolutional neural network (CNN) model, deep neural network (DNN) model, or a combination thereof.

The above one or more methods further comprise: integrating the recognition result of the first vehicle brand recognition region with the recognition result of the first color recognition region, and ranking colors and vehicle brands according to the integrated result.

According to one or more of the above method, the integrated comprises combining score of each vehicle brand in the recognition result of the first vehicle brand recognition region with score of each color in the recognition result of the first color recognition region; and ranking colors and vehicle brands according to the score combinations.

According to one or more of the above method, the integrated is based on the integrated model: $P_f = \theta_b P_b \delta + P_c \theta_c$; wherein $P_f$ is the score after integrating color and vehicle brand, $P_b$ is the score corresponding to each vehicle brand in the recognized vehicle brand list; $P_c$ is the score corresponding to each color in the recognized color list; the values of $\theta_b$ and $\theta_c$ satisfy the equation: $\theta^* = \arg\max \psi_N (\theta_b P_b \delta + P_c \theta_c)$; wherein arg refers to taking parameters; max refers to maximum value, $\theta^*$ represents $\theta_b$ and $\theta_c$, $\delta$ is a penalty factor, and ranking colors and vehicle brands according to the score obtained by integrating color and vehicle brand.

The above one or more methods further comprise: receiving a second image; extracting a second vehicle brand recognition region and a second color recognition region of the second image; recognizing the extracted second vehicle brand recognition region by the trained vehicle brand deep learning model; recognizing the extracted second color recognition region by the trained color deep learning model; recognizing the vehicle satisfying target vehicle information based on the recognition results of the first vehicle brand recognition region and the first color recognition region and the recognition results of the second vehicle brand recognition region and the second color recognition region.

The above one or more methods further comprise: integrating the recognition result of the first vehicle brand recognition region with the recognition result of the first color recognition region to obtain a first integrated result; integrating the recognition result of the second vehicle brand recognition region with the recognition result of the second color recognition region to obtain a second integrated result; and ranking according to the target vehicle information.

According to one or more of the above method, the ranking rule is that: the ranking is based on position and score of the color and vehicle brand defined by the target vehicle information in the first integrated result or the second integrated result.

The above one or more methods further comprises: receiving a second image and a target image; extracting a second vehicle brand recognition region and a second color recognition region of the second image; recognizing the extracted second vehicle brand recognition region by the trained vehicle brand deep learning model; recognizing the extracted second color recognition region by the trained color deep learning model; extracting a target vehicle brand recognition region and a target color recognition region of the target image; recognizing the extracted target vehicle brand recognition region by the trained vehicle brand deep learning model; recognizing the extracted target color recognition region by the trained color deep learning model; recognizing vehicles satisfying the target image based on the recognition results of the first vehicle brand recognition region and the first color recognition region and the recognition results of the second vehicle brand recognition region and the second color recognition region.

The above one or more methods further comprises: integrating the recognition result of the first vehicle brand recognition region with the recognition result of the first color recognition region to obtain a first integrated result; integrating the recognition result of the second vehicle brand recognition region with the recognition result of the second color recognition region to obtain a second integrated result; integrating the recognition result of the target vehicle brand recognition region with the recognition result of the target color recognition region to obtain a target integrated result; and ranking according to the target integrated result.

According to one or more of the above method, the ranking rule is that: the ranking is based on the similarity between the target integrated result and the first integrated result or the second integrated result.

The above one or more methods further comprises: integrating the recognition result of the first vehicle brand recognition region with the recognition result of the target vehicle brand recognition region to obtain a first vehicle brand optimal matching degree; integrating the recognition result of the first color recognition region with the recognition result of the target color recognition region to obtain a first color optimal matching degree; obtaining a first optimal matching degree according to the first vehicle brand optimal matching degree and the first color optimal matching degree; integrating the recognition result of the second vehicle brand recognition region with the recognition result of the target vehicle brand recognition region to obtain a second vehicle brand optimal matching degree; integrating the recognition result of the second color recognition region with the recognition result of the target color recognition region to obtain a second color optimal matching degree; obtaining a target integrated result by integrating the recognition result of the target vehicle brand recognition region with the recognition result of the target color recognition region; obtaining a second optimal matching degree according to the second vehicle brand optimal matching degree and the second color optimal matching degree; and ranking according to the first optimal matching degree and the second optimal matching degree.

According to one or more of the above method, the first optimal matching degree and the second optimal matching degree are calculated as follow:

$$M_f = \theta_b M_b \delta + M_c \theta_c;$$

wherein $M_f$ is the optimal matching degree, $M_b$ is the vehicle brand optimal matching degree; $M_c$ is the color optimal matching degree; and the values of $\theta_b$ and $\theta_c$ satisfy the following equation:

$$\theta^* = \arg\max \psi N(\theta_b M_b \delta + M_c \theta_c);$$

wherein arg refers to taking parameters, max is the maximum; $\theta^*$ represents $\theta_b$ and $\theta_c$, and $\delta$ refers to a penalty factor.

The above one or more methods further comprises: the result obtained by the trained vehicle brand/color deep learning model recognizing vehicle brand/color only comprises the first N items with the highest likelihood and the corresponding scores of the first N items, wherein N is 3 to 10, and preferably is 3 to 8, and more preferably is 4 to 6.

According to another aspect of this disclosure, a computer-readable storage medium storing codes is proposed, and the codes are run to implement any one of the claimed methods by a computing device.

According to another aspect of this disclosure, a vehicle recognition system is proposed. The system comprises: a vehicle brand recognition region extracting unit configured to extract vehicle brand recognition region; a vehicle brand recognition unit configured to recognize the extracted vehicle brand recognition region by a trained vehicle brand deep learning model; a color recognition region extracting unit configured to extract color recognition region; a color recognition unit configured to recognize the extracted color recognition region; and an integrated unit configured to integrate the recognition results of the vehicle brand recognition unit and the color recognition unit, and/or integrate the recognition results of the vehicle brand recognition unit or the color recognition unit among different images; and a ranking unit configured to rank according to the result of the integrated unit.

According to the above system, the trained vehicle brand deep learning model is based on convolutional neural network (CNN) model, deep belief network (DBN) model, recurrent neural network (RNN) model, or biological neural network (BNN), or combinations thereof.

According to the above system, the color recognition unit is configured to recognize the extracted color recognition region by a trained color deep learning model, wherein the trained color deep learning model is based on convolutional neural network (CNN) model, deep neural network (DNN) model, or a combination thereof.

BRIEF DESCRIPTION OF THE DRAWINGS

Preferred embodiments of this disclosure will be further described in connection with the accompanying drawings, including.

DETAILED DESCRIPTION

In order to make the objective, the technical solutions and the advantages to be clearer, the detailed description of the technical solutions will be set forth clearly and completely below in connection with the appended drawings. Obviously, the described embodiments are merely a part of, not all, embodiments. Based on the embodiments of this disclosure, all other embodiments obtained by persons skilled in the art without paying creative effort belong to the scope of this disclosure.

The detailed description below can refer to the appended drawings as a part of the present disclosure illustrating specific embodiments of the present application. In the appended drawings, similar reference signs describe substantively similar components in different drawings. Specific embodiments in this application are fully described as below, so that a person with ordinary knowledge and technology in the art can implement the technical solution of the present application. It should be understood that, other embodiments can be applied, or some modifications can be made to the structure, logic, or electrical property of the embodiments of the present application.

This disclosure provides a new way of vehicle recognition by recognizing vehicle brand and vehicle body color by means of artificial intelligence. The recognition speed is very fast and the accuracy rate has reached or exceeded the level of artificial recognition.

Figure 1:
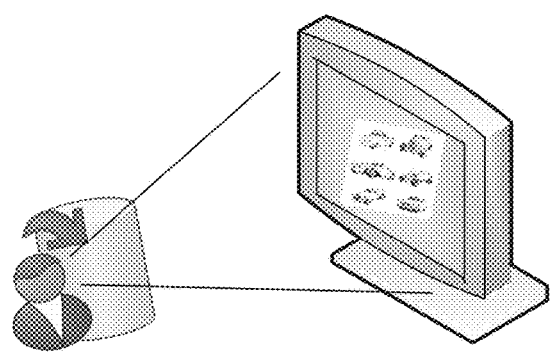
FIG. 1 illustrates a diagram of conventional artificial recognition.

FIG. 1 illustrates a diagram of conventional artificial recognition. In the conventional way, an operator's brain acts as a memory when facing massive surveillance videos or images. The operator is required to remember features of a target vehicle and then browses vehicle videos or images to be recognized. Those similar to the target vehicle are recognized by comparing that in the brain's remembrance with the browsed vehicles. Because the operator will be tired soon, the recognition is of low efficiency and inaccurate.

Figure 2:
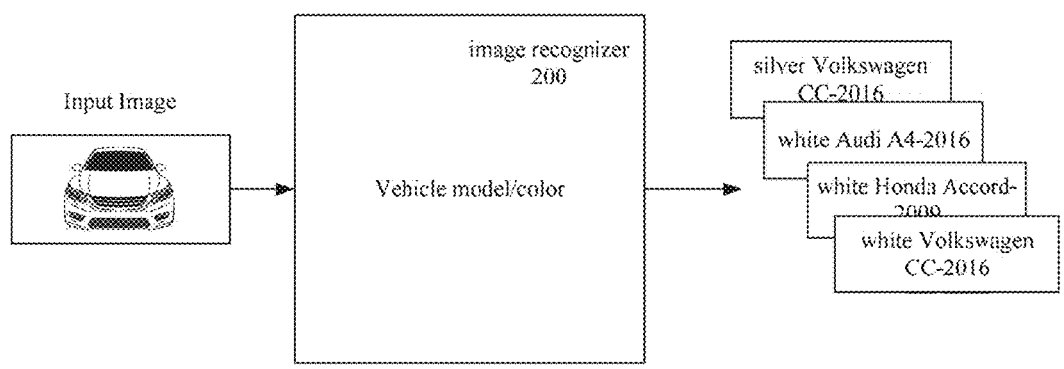
FIG. 2 illustrates a diagram of exemplary vehicle recognition according to an embodiment of this disclosure.

FIG. 2 illustrates a diagram of exemplary vehicle recognition according to an embodiment of this disclosure. As illustrated in FIG. 2, the image to be recognized is input to an image recognizer 200 according to an embodiment of this disclosure. The image recognizer 200 recognizes the vehicle brand recognition region and the color recognition region of the image to be recognized and produce one or more recognition results, such as white Volkswagen CC-2016, white Honda Accord-2009, grey Audi A4-2016, or silver Volkswagen CC-2016 . . . .

Figure 3:
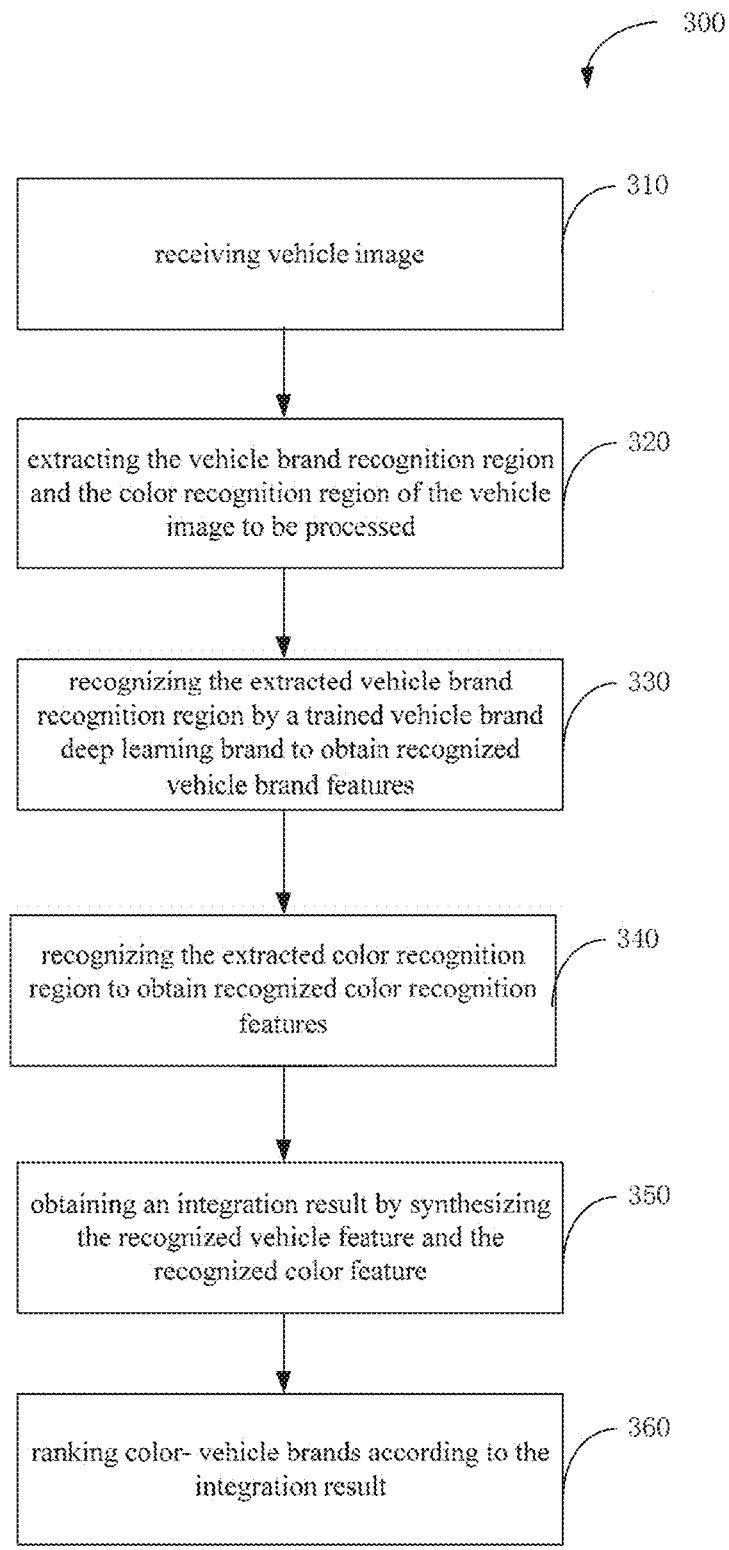
FIG. 3 illustrates a flow chart of exemplary vehicle recognition method according to an embodiment of this disclosure.

FIG. 3 illustrates a flow chart of exemplary vehicle recognition according to an embodiment of this disclosure. According to an embodiment of this disclosure, the method of FIG. 3 can be applied to the vehicle recognition illustrated in FIG. 2. As illustrated in FIG. 3, the method 300 comprises step 310 of receiving vehicle image and step 320 of extracting the vehicle brand recognition region and the color recognition region of the vehicle image to be processed.

Vehicle brand refers to a vehicle's model. For example, Volkswagen CC-2016 refers to a car in CC series manufactured in 2016 by the Volkswagen Corporation. For simplicity, only manufacturer and car series is adopted to describe the vehicle mode herein. It should be understood for persons skilled in the art that vehicle's manufacture time is also one of the features reflecting vehicle brands.

Vehicle brand recognition region refers to an region, in a vehicle image, showing vehicle's appearance features of manufacturer, series and time. Vehicle brand recognition region comprises vehicle face, vehicle shape, vehicle trail, vehicle door and window, and accessories, wherein the accessories comprise rearview mirror, decoration widgets, antenna, and so on. According to an embodiment of this disclosure, one of or a combination of the above parts can be used as the vehicle brand recognition region for vehicle recognition.

Although all the above parts can be used for vehicle brand recognition, in many vehicle images, deformation easily occurs to the characteristics of the vehicle shape and the door and window owing to photo shooting angle or vehicle's angle. As such, recognition is difficult and recognition rate is low. For the vehicle trail, the trail's difference among vehicles of different models is not obvious. The accessories usually occupy a small region in the images. It is difficult to use the accessories as the main vehicle brand recognition region because it's unclear. In contrast, the vehicle face part is usually clear in the images, the difference among different models is obvious, and deformation hard to be fixed is rarely appear. According to a preferred embodiment of this disclosure, the vehicle face is used as a main feature for vehicle brand recognition, and the other parts are used as auxiliary features.

According to another embodiment of this disclosure, only the vehicle face is used as the vehicle brand recognition region for vehicle brand recognition. The inventor of this application found that, according to the method of this disclosure, the recognition accuracy rate can reach over 90% even only the vehicle face is used as the vehicle brand recognition region.

In following embodiment, technical solutions of this disclosure are illustrated by using the vehicle face part as the vehicle brand recognition region. It should be understood by persons skilled in the art that other vehicle brand recognition regions or combinations thereof mentioned in the above can also be processed in a similar way in order to apply the technical solution of vehicle recognition in this disclosure, which are not repeated herein.

According to an embodiment of this disclosure, the vehicle face region is extracted from an input vehicle image and then is grayscale processed to obtain gray scale vehicle face region as the vehicle brand recognition region. It should be understood by persons skilled in the art that other vehicle face region extraction or processing ways can also be applied in the solution of this disclosure. For example, grayscale processing is not a necessary procedure.

According to an embodiment of this disclosure, vehicle body's location is positioned from the input vehicle image. For instance, the vehicle face, windows, or wheels are first recognized, and then vehicle body's region is positioned according to the relative location to the vehicle face, windows, or wheels. Alternatively, vehicle body is directly positioned by recognizing vehicle door, bonnet, trunk, or the largest region on the vehicle. Further, the vehicle body region is used as a color recognition region in step 320.

According to another embodiment of this disclosure, color region in the vehicle image is directly extracted as the color recognition region by profile weakening, color smoothing and image denoising with the vehicle image.

According to an embodiment of this disclosure, vehicle image is preprocessed with technologies like intensity adjustment, contrast adjustment, image denoising, and normalization, to reduce the impact of light condition, exposure time, aperture, and exposure capability on the image.

In step 330, the extracted vehicle brand recognition region is recognized by a trained deep learning model to obtain recognized vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

The P.R.C patent Application No. 201610368032.6 entitled "CONVOLUTIONAL NEURAL NETWORK BASED VEHICLE RECOGNITION METHOD AND DEVICE" filed on 30 May 2016 disclosed a specific embodiment of vehicle recognition using convolutional neural network, which is incorporated by reference herein in its entirety as a useful reference.

According to an embodiment of this disclosure, an example of deep belief network (DBN) model for vehicle recognition comprises multilayer Restricted Boltzmann Machine (RBM). Each layer RBM comprises a visible layer and a hidden layer. Furthermore, connection only exists between the visible layer and the hidden layer and there is no connection in either the visible layer or the hidden layer. When building the specific model, a first RBM is fully trained by contrastive divergence learning method, and then the weights and the offsets of the first RBM are determined. Next, the recessive neural states of the first RBM are used as the input vectors of a second RBM. The second RBM is piled on the first RBM after being fully trained. The above steps are repeated until a satisfactory recognition model is obtained. DBN makes the whole neural network to generate a generation model of training data according to maximum score by training weights between its neurons. Therefore, a fully trained DBN can be used to recognize the vehicle brand recognition region.

According to an embodiment of this disclosure, recurrent neural network (RNN) can also be used for vehicle brand recognition. For example, a sequence describable with RNN can be produced by traversing vehicle images through certain rules. The images in the sequence are sub-regions of the original image. Sub-region image sequence is input to the two-layer RNN. The output results by RRN's first layer are used to refine the portions in the results of the rough significance detection corresponding to the sub-regions. The outputs of RRN's second layer are used to generate a space transfer matrix. The space transfer matrix is used to generate the RNN input image sub-region sequence and the locations of decoding results of RNN's first layer corresponding to the results of rough significance detection. Eventually, the rough significance region detection results are refined to be the final significance detection results.

Compared with technical solutions for vehicle brand recognition using features selected and designated by human beings, such as histogram of oriented gradient (HOG), local binary pattern (LBP), scale invariant feature transform (SIFT), etc., and classifiers like support vector machine (SVM) or artificial neural network (ANN), this disclosure adopting a deep learning model for vehicle recognition has advantages because only the classifiers' parameters can be adjusted once the selected features have been determined, which causes degradation of the whole recognition performance. In contrast, in this disclosure, the vehicle brand recognition method based on deep learning model can train and adjust both features and classifiers such that the recognition capability is improved significantly.

It should be understood for persons skilled in the art that other deep learning models, such as biological neural network (BNN) model, after training, can also be used to recognize vehicle brands in vehicle images. Therefore, these deep learning models for vehicle recognition are also within the scope of the present disclosure.

According to an embodiment of this disclosure, a vehicle brand list is obtained after being recognized by a deep learning model, wherein vehicle brand nearer to the top of the list has a higher score, and wherein vehicle brand's score is the probability of the vehicle brand after recognizing a vehicle image or at least partly based on the probability.

For example, one possible list of the image in FIG. 2 after being recognized is as follow:

| Vehicle brand List | Score |
| --- | --- |
| Volkswagen CC | 0.85 |
| Honda Accord | 0.10 |
| Audi A4 | 0.02 |
| ... | ... |
| ... | ... |

In step 340, the extracted color recognition region is recognized to obtain recognized color recognition features.

According to an embodiment of this disclosure, the extracted color recognition region is compared with standard color to determine vehicle body's color. The color is influenced by many interference factors. Although preprocessing has been made to images to reduce influence of these factors, the conclusion gotten by a simple comparison most time is still of great difference from real color of vehicle body.

According to an embodiment of this disclosure, statistics of each color in the color recognition region is calculated, and empirical thresholds are used to determine which color the color recognition region is. Alternatively, according to another embodiment of this disclosure, a characteristic value (such as color histogram and color moment) of the overall color in the color recognition region is calculated, and then the color characteristic value is used to match color. However, the former's threshold determination is difficult and the later requires complicated computation but has a poor discrimination to similar color.

According to a preferred embodiment of this disclosure, a trained deep learning model can be used to recognize the extracted color recognition region to obtain a recognized color recognition feature. According to an embodiment of this disclosure, the deep learning model for color recognition can be based on convolutional neural network (CNN), deep neural network (DNN), etc.

According to an embodiment of this disclosure, a trained deep learning model can be used to recognize the extracted vehicle color. According to an embodiment of this disclosure, the trained deep learning model comprises but is not limited to convolutional neural network (CNN) model, deep neural network (DNN) model, etc.

According to an embodiment of this disclosure, a number of points are taken from vehicle body region to be recognized, the color values of these points are transformed to color values of a permanent color space. As such, all the transformed points constitute three-dimensional color space data. Finally, the data is input to predefined and trained CNN model or DNN model for color recognition.

According to an embodiment of this disclosure, a color list is obtained after recognition, wherein color nearer to the top of the list has a higher score, and wherein color's score is the probability of the color after recognizing a vehicle image or at least partly based on the probability.

For example, one possible list of the image in FIG. 2 after being recognized is as follow:

| Color List | Score |
| --- | --- |
| white | 0.99 |
| silver | 0.006 |
| gray | 0.003 |
| ... | ... |
| ... | ... |

In step 350, an integrated result is obtained by combining the recognized vehicle brand features and the recognized color features. According to an embodiment of this disclosure, the integrated result is obtained by adding vehicle brand list scores to color list scores.

According to the example of the image in FIG. 2, the final output result is as follow:

| Color and Vehicle brand List | Score |
| --- | --- |
| white Volkswagen CC | 1.84 |
| white Honda Accord | 1.09 |
| white Audi A4 | 1.01 |
| silver Volkswagen CC | 0.106 |
| gray Volkswagen CC | 0.103 |
| silver Honda Odyssey | 0.066 |

| Color and Vehicle brand List | Score |
|---|---|
| gray Honda Odyssey | 0.063 |
| silver Audi A4 | 0.026 |
| gray Audi A4 | 0.023 |
| ... | ... |
| ... | ... |

The inventor found that the integrated result sometimes is unsatisfied and can be further improved. In order to fully utilize the deep learning result, an integrated model is proposed according to an embodiment of this disclosure.

Specifically, it is defined that the target function $\psi_N$ is comparison correction rate of top N in data set D, and, $\theta \in (\theta_b, \theta_c)$ are parameters. When $\psi_N$ is maximum value, the corresponding $\theta_b$ and $\theta_c$ are weights that need optimization, i.e., $$\theta^* = \arg\max \psi_N(\theta_b P_b \delta + P_c \theta_c),$$

wherein arg refers to taking parameters; max refers to maximum value, $\theta^*$ represents $\theta_b$ and $\theta_c$, $P_b$ is the score corresponding to vehicle brand in the recognized vehicle brand list; $P_c$ is the score corresponding to color in the recognized color list; $\delta$ is a penalty factor, representing the adjustment of weight proportion. $\delta$ is usually less than 0.5, and preferably 0.3 to 0.5; N is generally less than 5. If the value of $\delta$ is determined, the list can be ranked according to the value of $P_f = \theta_b P_b \delta + P_c \theta_c$, and the values of weights $\theta_b$ and $\theta_c$ can be determined when function of the first N results in the ranking list comprise the correct item reaches the highest score. That is to say, $\theta_b$, $\theta_c$, and $\delta$ can be deemed as parameters of the integrated model in the embodiment of this disclosure. With respect to a group of training sets, integrated models are trained according to the values of $\delta$, different $\theta_b$ and $\theta_c$ are got, i.e., different integrated models. According to an embodiment of this disclosure, the integrated model with the highest recognition accuracy rate is selected as the training result, i.e., an integrated model defined by $\theta_b$, $\theta_c$, and $\delta$.

Pf=θbPbδ+Pcθc is calculated by a trained integrated model and is used in ranking the calculated results, and the ranking result is output as the result of integrated, wherein Pb is the score corresponding to vehicle brand in the vehicle brand list recognized by the trained integrated model, and Pc is the score corresponding to color in the output list. According to an embodiment of this disclosure, compared with the integrated of respectively adding the scores of vehicle brands and the scores of colors, the integrated model defined by θb, θc, and δ improves accuracy rate by about 15%.

In step 360, colors and vehicle brands are ranked according to the integrated results and the ranking results are output. For example, the integrated results are ranked from large to small. Therefore, the method of this disclosure can achieve ranking of colors and vehicle brands, recognizing vehicle image.

Persons skilled in the art should understand that the above merely gives embodiments of integrating results obtained by a trained deep learning model recognizing vehicle brand and color. In this technical field, there are other ways of taking vehicle brand and color into account, which are also within the scope of this disclosure.

Figure 4:
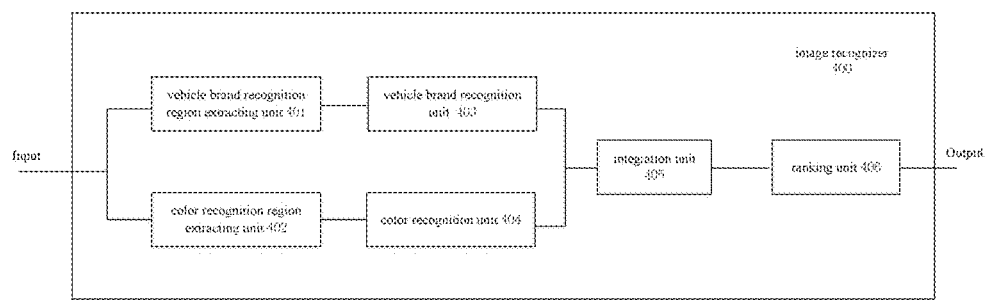
FIG. 4 illustrates a diagram of exemplary image recognizer according to an embodiment of this disclosure.

FIG. 4 illustrates a diagram of an exemplary image recognizer according to an embodiment of this disclosure. As illustrated in FIG. 4, an image recognizer 400 comprises a vehicle brand recognition region extracting unit 401 and a vehicle recognition unit 403. According to an embodiment of this disclosure, the vehicle brand recognition region extracting unit 401 extracts vehicle face region from an input vehicle image, and then makes grayscale process to the vehicle face to obtain gray scale vehicle face region.

Further, in the vehicle recognition unit 403, a trained deep learning model is used to recognize the vehicle face region obtained by the vehicle brand recognition region extracting unit 401. According to an embodiment of this disclosure, the deep learning model comprises but is not limited to convolutional neural network (CNN) model, deep belief network (DBN) model, recurrent neural network (RNN) model, and so on.

The image recognizer 400 further comprises a color recognition region extracting unit 402 and a color recognition unit 404. According to an embodiment of this disclosure, the color recognition region extracting unit 402 locates the vehicle body's position from an input vehicle image. According to another embodiment of this disclosure, the color recognition region extracting unit 402 directly extract color recognition region by profile weakening, color smoothing and image denoising in the vehicle image. According to an embodiment of this disclosure, the color recognition region extracting unit 402 preprocesses the vehicle image by technologies like intensity adjustment, contrast adjustment, image denoising, normalization, to reduce the impact of light condition, exposure time, aperture, and exposure capability on the image.

According to an embodiment of this disclosure, the color recognition unit 404 compares the extracted color recognition region with standard color to determine vehicle body's color.

According to an embodiment of this disclosure, the color recognition unit 404 calculates statistics of each color in the color recognition region, and determines which color the color recognition region is according to empirical thresholds. Alternatively, according to another embodiment of this disclosure, the color recognition unit 404 calculates a characteristic value (such as color histogram, color moment) of the overall color in the color recognition region, and then matches color by the color characteristic value.

According to an embodiment of this disclosure, the color recognition unit 404 uses a trained deep learning model to recognize the extracted vehicle color region. The deep learning model comprises but is not limited to convolutional neural network (CNN) model, deep neural network (DNN) model and so on.

The image recognizer 400 further comprises an integrated unit 405. According to an embodiment of this disclosure, the integrated unit 405 respectively adds the scores of vehicle brands and the scores of colors to obtain a number of integrated results. According to another embodiment of this disclosure, the integrated model defined in FIG. 3 can be used to take vehicle recognition region and color recognition region into account to obtain the integrated results.

The image recognizer 400 further comprises a ranking unit 406. The ranking unit 406 can rank according to a predetermined rule. For example, the ranking unit 406 can rank integrated results and output ranking results from large to small. The ranking unit 406 can rank according to other rules. When a number of vehicle images are input, the ranking unit 406 can also rank the input vehicle images. Various ranking ways described in following embodiments can also be implemented by the ranking unit 406.

Examples for Application Scenarios

Take the example of a traffic policeman searching for an unlicensed accident vehicle. If the traffic policeman only has an image of the accident vehicle, but he/she is not entirely sure what the color and the model of the accident vehicle are since there are a plenty of vehicles have similar shapes and colors. The method and the image recognizer according to the embodiments of this disclosure can be used to help the traffic policeman in recognition of the color and the model of the accident vehicle.

Figure 5:
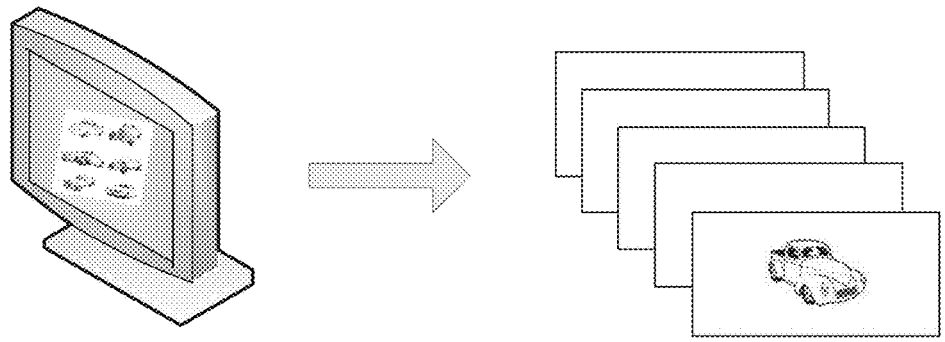
FIG. 5 illustrates a diagram of producing an image to be recognized according to an embodiment of this disclosure.

FIG. 5 illustrates a diagram of producing an image to be recognized according to an embodiment of this disclosure. This disclosure is preferably applicable to the video streaming scenario, such as video surveillance. Images obtained from video surveillance may comprise many vehicles and may also comprise the same vehicle at different moments. According to an embodiment of this disclosure, images to be recognized used for vehicle recognition with this disclosure are obtained from videos.

A video image at one moment may comprise multiple vehicles. According to an embodiment of this disclosure, landmark objects in the picture like road, roadbed, bealock, traffic signs, and tress are first recognized. The regions where vehicles might appear are determined based on the recognized landmark objects, and then the video image is partitioned accordingly. A trained deep learning model can also be used in recognize the partitions of image where vehicles might appear. Alternatively, a vehicle may be recognized by recognizing representative objects like wheels, door, and window to locate the partitions where the vehicle might appear. Next, the regions where the vehicle are located are determined by the recognized vehicle, to produce images to be recognized.

Persons skilled in the art should understand that many methods can be used for recognizing a vehicle in a video picture and are not repeated herein. All these vehicle recognition methods can be applied to this disclosure to generate vehicle image to be recognition. The method or device for generating vehicle image to be recognition from video images can be combined with the image recognition method or the image recognizer of this disclosure, so as to the technical solution of this application can directly process video data.

According to an embodiment of this disclosure, a step for recognizing license plate in the vehicle image may be also included to expend application of this disclosure, including: recognizing the license plate region in the vehicle image and recognizing numbers and letters of the license plate in the license plate region to get the license plate number in the vehicle image.

According to an embodiment of this disclosure, if in the vehicle image the vehicle has no license plate or the license plate cannot be recognized due to stain, cover, or obscure, the model and color in the vehicle image may be recognized in order to identify the vehicle.

Figure 6:
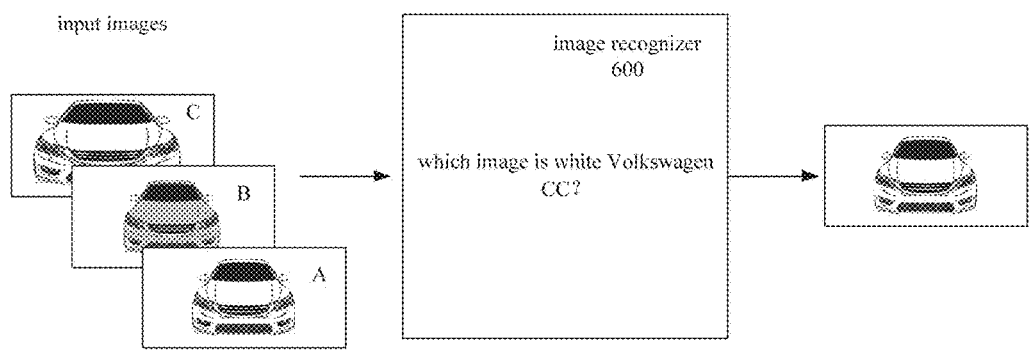
FIG. 6 illustrates a diagram of recognizing a vehicle from multiple images according to an embodiment of this disclosure.

FIG. 6 illustrates a diagram of recognizing vehicle from a number of images according to an embodiment of this disclosure. As illustrated in FIG. 6, an image recognizer 600 recognizes an eligible vehicle image from a number of input vehicle images. For example, the image recognizer 600 receives an instruction of finding white Volkswagen CC. In the input vehicle images, the image recognizer 600 can recognize which one or ones are eligible. According to an embodiment of this disclosure, the image recognizer structured as in FIG. 4 can be also used to implement this function.

Figure 7:
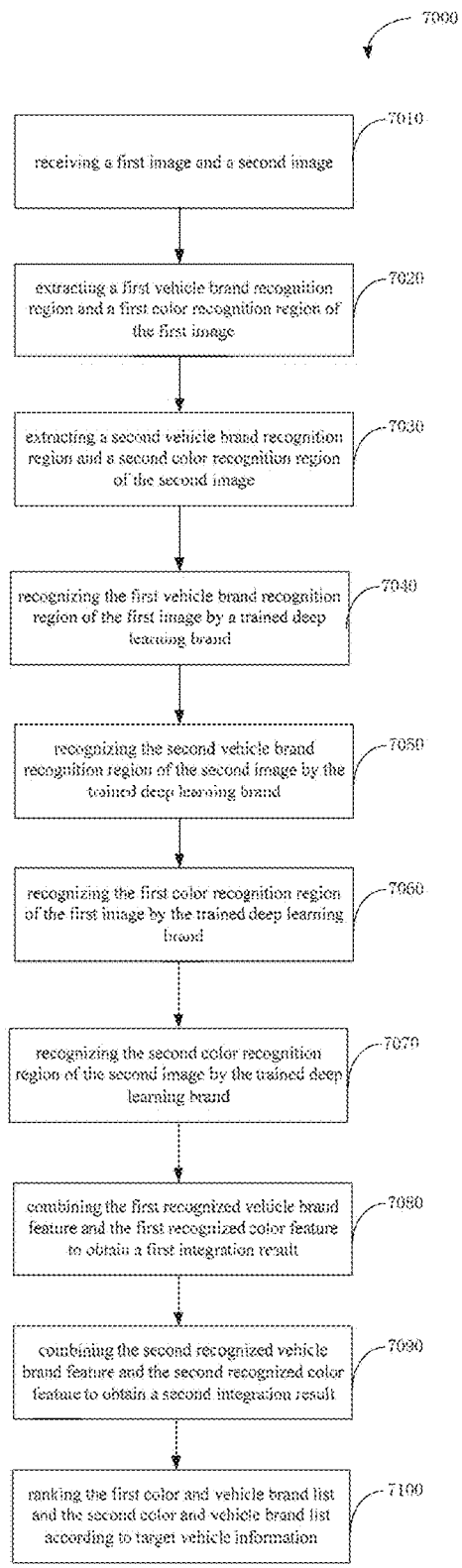
FIG. 7 illustrates a flow chart of an exemplary method of recognizing a vehicle from multiple images according to an embodiment of this disclosure.

FIG. 7 illustrates a flow chart of an exemplary method of recognizing a vehicle from a number of images according to an embodiment of this disclosure. The method of FIG. 7 can be applied to the embodiment of FIG. 6. As illustrated in FIG. 7, a method 7000 comprises the following steps: in step 7010, a first image and a second image are received;

In step 7020, a vehicle brand recognition region and a color recognition region of the first image are extracted. The aforementioned vehicle brand recognition region and color recognition region extracting methods can be used to extract a vehicle brand recognition region and a color recognition region of the first image.

In step 7030, a vehicle brand recognition region and a color recognition region of the second image are extracted. The aforementioned vehicle brand recognition region and color recognition region extracting methods can be used to extract a vehicle brand recognition region and a color recognition region of the second image.

In step 7040, the vehicle brand recognition region of the first image is recognized by a trained deep learning model to obtain first recognized vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

In step 7050, the vehicle brand recognition region of the second image is recognized by the trained deep learning model to obtain second recognized vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

In step 7060, the color recognition region of the first image is recognized by the trained deep learning model to obtain first recognized color features. According to an embodiment of this disclosure, the deep learning model for color recognition can be based on convolutional neural network (CNN), deep neural network (DNN), etc.

In step 7070, the color recognition region of the second image is recognized by the trained deep learning model to obtain second recognized color features. According to an embodiment of this disclosure, the deep learning model for color recognition can be based on convolutional neural network (CNN), deep neural network (DNN), etc.

In step 7080, the first recognized vehicle brand features and the first recognized color features are combined to obtain first integrated results, wherein the first integrated results comprise a first color and vehicle brand list ranking from large to small according to the scores.

In step 7090, the second recognized vehicle brand features and the second recognized color features are combined to obtain a second integrated result, wherein the second integrated results comprise a second color and vehicle brand list ranking from large to small order according to scores.

In step 7100, the first color and vehicle brand list and the second color and vehicle brand list are ranked according to target vehicle information. According to an embodiment of this disclosure, as to the first color and vehicle brand list and the second color and vehicle brand list, the list with target vehicle information nearer to its top thereof is ranked at the front. If the target vehicle information is located in the same position in the first and second lists, the list whose target vehicle information has a higher score is ranked at the front.

For example, the target information is white Volkswagen CC; and an integrated result of list A is as follow:

| Color and Vehicle brand List | Score |
| --- | --- |
| white Volkswagen CC | 1.84 |
| white Honda Accord | 1.09 |
| white Audi A4 | 1.01 |
| ... | ... |
| ... | ... |

An integrated result of list B is as follow:

| Color and Vehicle brand List | Score |
| --- | --- |
| gray Volkswagen CC | 1.84 |
| gray Honda Accord | 1.09 |
| gray Audi A4 | 1.01 |
| white Volkswagen CC | 0.06 |
| ... | ... |
| ... | ... |

An integrated result of list C is as follow:

| Color and Vehicle brand List | Score |
| --- | --- |
| white Volkswagen CC | 1.25 |
| white Honda Accord | 1.14 |
| white Audi A4 | 1.08 |
| gray Volkswagen CC | 0.31 |
| ... | ... |
| ... | ... |

As described in step 7100, comparing list A with list C, the list A is ranked at the front of C because the score of white Volkswagen CC in list A is higher than that in list C although the target vehicle information in both list A and list C is ranked first; comparing list C with list B, the list C is ranked at the front of B because the target vehicle information in list C is ranked first but that in list B is ranked fourth. That is, the ranking result is A, C, and B.

Finally, the first image and the second image are ranked according to the ranking result of the first color and vehicle brand list and the second color and vehicle brand list.

Persons skilled in the art should understand that when receiving a number of vehicle images, integrated color and vehicle brand lists of vehicle images can be obtained after respectively recognizing vehicle brand and color of vehicle images. The integrated color and vehicle brand lists are ranked according to vehicle information to be recognized. If the color and vehicle brand defined by the vehicle information to be recognized is nearer to the top of a list and has a higher score, the list will be ranked nearer the front. After the vehicle images are ranked in the same order, the vehicle image which matches more of the vehicle information to be recognized will be ranked nearer to the front. As such, the method of this embodiment can realize recognition of vehicle images via the vehicle information.

Examples for Application Scenarios

Take the example of a traffic policeman searching for unlicensed accident vehicle. Suppose that the traffic policeman has already known the color and model of the accident vehicle and wishes to find the accident vehicle from a surveillance video. Based on this disclosure, vehicle images can first be obtained from the surveillance videos and then, the recognition method and device according to this disclosure can be used to recognize the vehicle having desire color and model from vehicle images of massive surveillance video.

Figure 8:
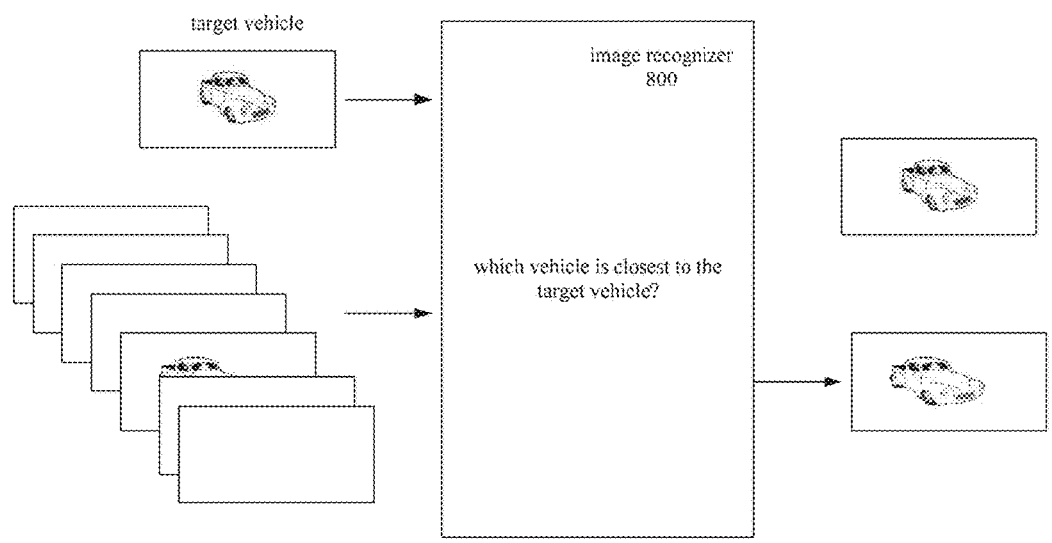
FIG. 8 illustrates a diagram of recognizing a target vehicle from multiple images according to an embodiment of this disclosure.

FIG. 8 illustrates a diagram of recognizing target vehicle from a number of images according to an embodiment of this disclosure. As illustrated in FIG. 8, an image recognizer 800 receives the target vehicle image and a number of vehicle images. The image recognizer 800 recognizes an eligible vehicle image from the input vehicle images. For example, the image recognizer 800 receives the instruction of finding the vehicle image closest to the target image. The image recognizer 800 can recognize which one or which ones are closest to the target image in the input vehicle images. According to an embodiment of this disclosure, the recognizer structured as in FIG. 4 can also be used to implement this function.

Figure 9:
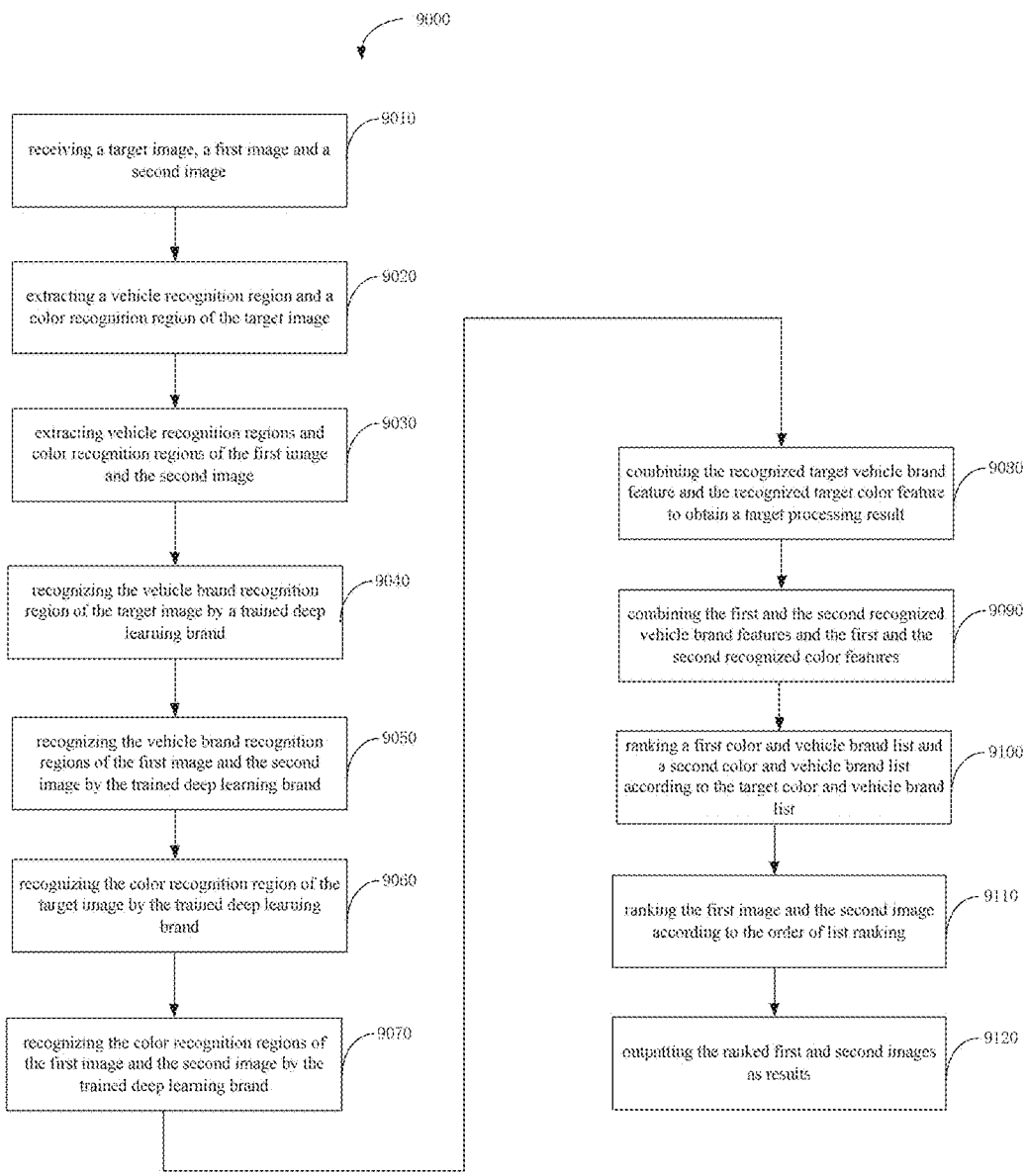
FIG. 9 illustrates a flow chart of an exemplary method of recognizing a target vehicle from multiple images according to an embodiment of this disclosure.

FIG. 9 illustrates a flow chart of an exemplary method of recognizing target vehicle from a number of images according to an embodiment of this disclosure. As illustrated in FIG. 9, the method 9000 comprises: in step 9010, a target image, a first image and a second image are received.

In step 9020, a vehicle recognition region and a color recognition region of the target image are extracted.

In step 9030, vehicle recognition regions and color recognition regions of the first image and the second image are extracted.

In step 9040, the vehicle brand recognition region of the target image is recognized by a trained deep learning model to obtain recognized target vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

In step 9050, the vehicle brand recognition regions of the first image and the second image are recognized by the trained deep learning model to obtain a first and a second recognized vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

In step 9060, the color recognition region of the target image is recognized by the trained deep learning model to obtain recognized target color features. According to an embodiment of this disclosure, the deep learning model for color recognition can be based on convolutional neural network (CNN), deep neural network (DNN), etc.

In step 9070, the color recognition regions of the first image and the second image are recognized by the trained deep learning model to obtain first and second recognized color features. According to an embodiment of this disclosure, the deep learning model for color recognition can be based on convolutional neural network (CNN), deep neural network (DNN), etc.

In step 9080, the recognized target vehicle brand feature and the recognized target color feature are combined to obtain a target processing result, wherein the target processing result comprises a target color and vehicle brand list ranking from large to small according to the scores.

In step 9090, the first and the second recognized vehicle brand features and the first and the second recognized color features are combined to obtain a first and a second processing results, wherein the first and the second processing results comprise a first and a second color and vehicle brand lists ranking from large to small according to the scores.

In step 9100, the first color and vehicle brand list and the second color and vehicle brand list are ranked according to the target color and vehicle brand list. According to an embodiment of this disclosure, with respect to the first color and vehicle brand list and the second color and vehicle brand list, the one whose first N items are closer to those of the target list is ranked at the front, wherein N is 5 to 10. For example, the list who has less items different from the target list is deemed closer to the target list. When the two lists have the same number of items that are different from those of the target list, a list is deemed closer to the target list if the different items are ranked further at the rear. If the first N items of lists are the same as those of the target list, the list whose scores of the N items are higher is ranked at the front. According to an embodiment of this disclosure, the list whose first N items scores has a smaller mean-square deviation with respect to those of the target list has scores closer to those of the target list.

Persons skilled in the art should understand that the above comparisons of the target color and vehicle brand list with the first and the second color and vehicle lists are used for illustration. Persons skilled in the art motived by this concept can conceive of other embodiments, which are also within the scope of this disclosure.

In step 9110, the first image and the second image are ranked according to the order of list ranking.

In step 9120, the ranked first and second images are output as results.

Persons skilled in the art should understand that when receiving more than 2 vehicle images, vehicle brand and color of vehicle images may be respectively recognized to obtain integrated color and vehicle brand lists of vehicle images. The integrated color and vehicle brand lists may be ranked according to the target color and vehicle brand list, wherein the color and vehicle brand list closer to the target color and vehicle brand list is ranked nearer to the front. After all vehicle images are ranked, the vehicle image closest to the target vehicle image will be ranked at the front. As such, the method according to this embodiment can recognize the vehicle image closest to the target vehicle image, so as to identify the target vehicle.

In order to further improve recognition accuracy, an embodiment of recognition for integrating a target vehicle and a vehicle to be recognized is proposed as follow. According to the inventor's experiments, the recognition way of integrating a target vehicle and a vehicle to be recognized can improve the recognition accuracy by about 20%.

Figure 10:
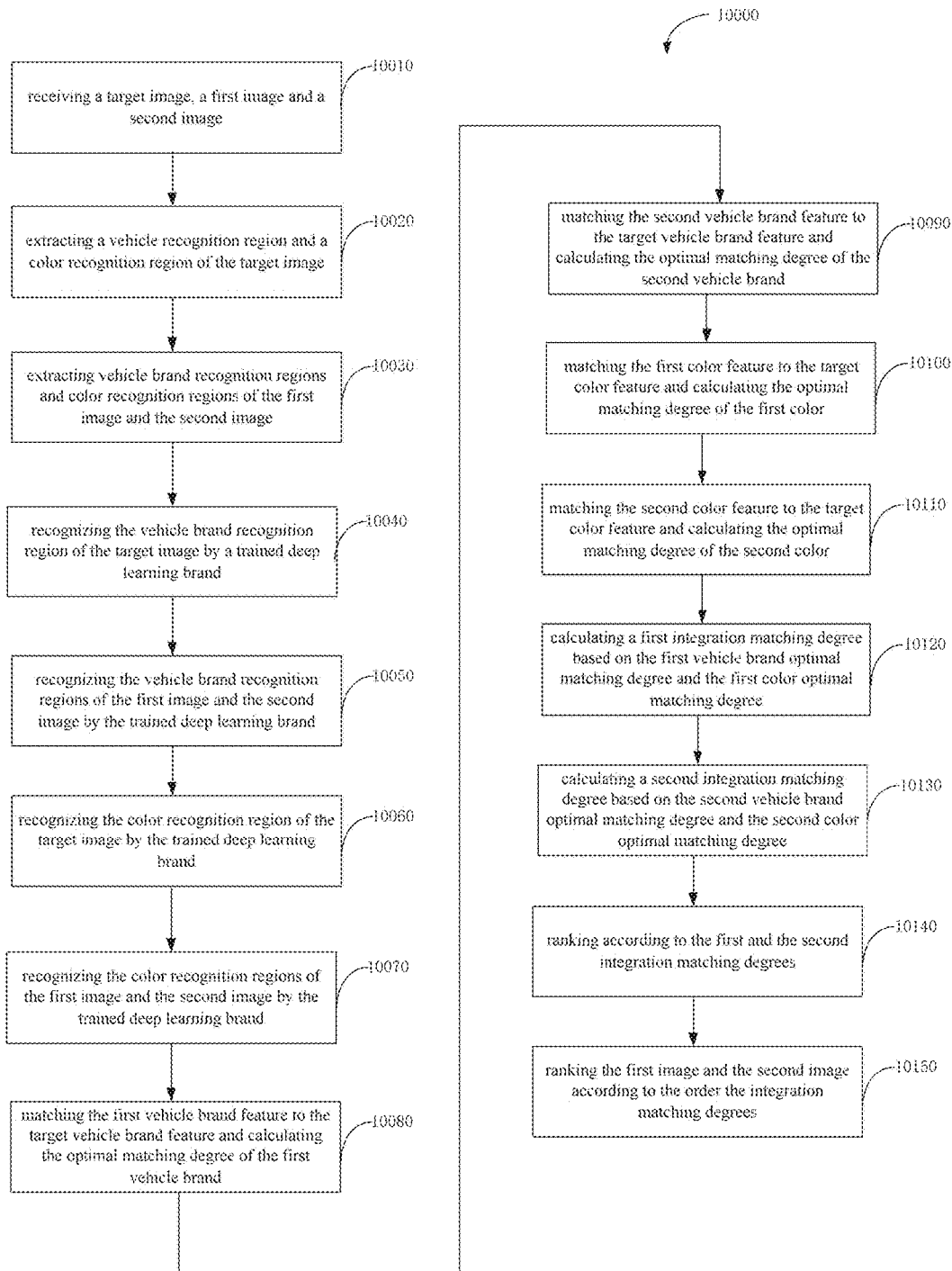
FIG. 10 illustrates a flow chart of an exemplary method of recognizing a target vehicle from multiple images according to another embodiment of this disclosure.

FIG. 10 illustrates a flow chart of an exemplary method of recognizing target vehicle from multiple images according to an embodiment of this disclosure. As illustrated in FIG. 10, the method 10000 comprises:

In step 10010, a target image, a first image and a second image are received.

In step 10020, a vehicle brand recognition region and a color recognition region of the target image is extracted.

In step 10030, vehicle brand recognition regions and color recognition regions of the first image and the second image are extracted.

In step 10040, the vehicle brand recognition region of the target image is recognized by a trained deep learning model to obtain recognized target vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

In step 10050, the vehicle brand recognition regions of the first image and the second image are recognized by the trained deep learning model to obtain first and second recognized vehicle brand features. According to an embodiment of this disclosure, the deep learning model for vehicle brand recognition can be based on convolutional neural network (CNN), deep belief network (DBN), or recurrent neural network (RNN), biological neural network (BNN), and so on.

In step 10060, the color recognition region of the target image is recognized by the trained deep learning model to obtain recognized target color features. According to an embodiment of this disclosure, the deep learning model for color recognition can be based on convolutional neural network (CNN), deep neural network (DNN), etc.

In step 10070, the color recognition regions of the first image and the second image are recognized by the trained deep learning model to obtain first and second recognized color features. According to an embodiment of this disclosure, the deep learning model for color recognition can be based on convolutional neural network (CNN), deep neural network (DNN), etc.

In step 10080, the first vehicle brand features and the target vehicle brand features are matched and the optimal matching degree of the first vehicle brand is calculated. According to an embodiment of this disclosure, the vehicle brand optimal matching degree is calculated as follow: the first vehicle brand features are matched to the target vehicle brand features in pairs, and the corresponding scores are added and then divided by 2 to obtain an arithmetic mean value. The maximum value in all the vehicle brand arithmetic mean values is the optimal matching degree.

According to another embodiment of this disclosure, the vehicle brand optimal matching degree can also be calculated as follow: the first vehicle brand recognition regions are matched to the target vehicle brand recognition regions in pairs, and the corresponding scores are squared and added up, then the square root thereof is a root mean square average. The maximum value in all the vehicle brand root mean square average values is the optimal matching degree.

Persons skilled in the art should understand that, similar to the above embodiment, there are other ways in the art can be used to calculate the optimal matching degree, which are also within the scope of this disclosure.

In step 10090, the second vehicle brand feature and the target vehicle brand feature are matched and the optimal matching degree of the second vehicle brand is calculated. Similar to step 10080, the optimal matching degree of the second vehicle brand is calculated based on the second vehicle brand features and the target vehicle brand features.

Step 10100, the first color feature and the target color feature are matched and the optimal matching degree of the first color is calculated. According to an embodiment of this disclosure, the color optimal matching degree is calculated as follow: the first color features are matched to the target color features in pairs, and the corresponding scores are added and then divided by 2 to obtain an arithmetic mean value. The maximum value in all the color arithmetic mean values is the optimal matching degree.

According to another embodiment of this disclosure, the color optimal matching degree can also be calculated as follow: the first color recognition regions are matched to the target color recognition regions in pairs, and the corresponding scores are squared and added up, and then the square root thereof is a root mean square average. The maximum value in all the color root mean square average values is the optimal matching degree.

Persons skilled in the art should understand that, similar to the above embodiment, there are other ways in the art can be used to calculate the optimal matching degree, which are also within the scope of this disclosure.

In step 10110, the second color features and the target color features are matched and the optimal matching degree of the second color is calculated. Similar to step 10100, the optimal matching degree of the second color is calculated based on the second color feature and the target color feature.

In step 10120, a first integrated matching degree is calculated based on the first vehicle brand optimal matching degree and the first color optimal matching degree. According to an embodiment of this disclosure, the integrated matching degree can be calculated according to the following method: adding the vehicle brand optimal matching degree to the color optimal matching degree to obtain the integrated matching degree.

According to an embodiment of this disclosure, an integrated model can be introduced to further improve the recognition accuracy. Specifically, it is defined that the target function $\psi_N$ is the comparison correction rate of top N in data set D and $\theta \in (\theta_b, \theta_c)$. When $\psi_N$ is maximum value, the corresponding $\theta_b$ and $\theta_c$ are weights that need optimization, i.e., $$\theta^* = \arg\max \psi_N(\theta_b M_b \delta + M_c \theta_c),$$

wherein arg refers to taking parameters; max refers to maximum value, $\theta^*$ represents $\theta_b$ and $\theta_c$, $M_b$ is the vehicle brand optimal matching degree; $M_c$ is the color optimal matching degree; and $\delta$ is a penalty factor, representing the adjustment of weight proportion. $\delta$ is less than 0.5, and preferably 0.3 to 0.5; N is generally less than 5. If the value of $\delta$ is determined, a list may be ranked according to the value $M_f = \theta_b M_b \delta + M_c \theta_c$, and the values of weights $\theta_b$ and $\theta_c$ can be determined when the function of the first 5 results in the ranking list comprising the correct item reaches the highest score. That is to say, $\theta_b$, $\theta_c$, and $\delta$ can be deemed as parameters of the integrated model in the embodiment of this disclosure. With respect to a group of training sets, integrated models are trained according to the values of $\delta$, so as to obtain different sets of $\theta_b$ and $\theta_c$, i.e., different integrated models. According to an embodiment of this disclosure, the integrated model with the highest recognition accuracy rate is selected as the training result, i.e., the integrated model defined by $\theta_b$, $\theta_c$, and $\delta$. $M_f$ of an image is calculated by a trained integrated model, wherein $M_f$ is the integrated matching degree.

In step 10130, a second integrated matching degree is calculated based on the second vehicle brand optimal matching degree and the second color optimal matching degree. The second integrated matching degree is calculated in the way similar to step 10120.

Step 10140, the first and the second integrated matching degrees are ranked. According to an embodiment, the higher the integrated matching degree is, the nearer it located to the top of the list.

Step 10150, the first image and the second image are ranked according to the order the integrated matching degrees. As such, the sorting of the first image and the second image is achieved.

Persons skilled in the art should understand that when a number of images are input, the image closest to the target image can be recognized by calculating the integrated matching degree of the images with respect to the target image and ranking accordingly.

For example, the vehicle brand list and the color list of the first image are as follows:

| Vehicle brand List | Vehicle brand Score | Color List | Color score |
|---|---|---|---|
| Volkswagen CC | 0.85 | white | 0.99 |
| Honda Odyssey | 0.10 | silver | 0.006 |
| Audi A4 | 0.02 | gray | 0.003 |
| ... | ... | ... | ... |
| ... | ... | ... | ... |

The vehicle brand list and the color list of the second image are as follows:

| Vehicle brand List | Vehicle brand Score | Color List | Color score |
|---|---|---|---|
| Volkswagen CC | 0.35 | white | 0.99 |
| Honda Odyssey | 0.26 | silver | 0.006 |
| Audi A4 | 0.09 | gray | 0.003 |
| ... | ... | ... | ... |
| ... | ... | ... | ... |

The vehicle brand list and the color list of the target image are as follows:

| Vehicle brand List | Vehicle brand Score | Color List | Color score |
|---|---|---|---|
| Volkswagen CC | 0.46 | white | 0.86 |
| Honda Odyssey | 0.19 | silver | 0.10 |
| Audi A4 | 0.11 | gray | 0.05 |
| ... | ... | ... | ... |
| ... | ... | ... | ... |

After calculation, the first vehicle brand optimal matching degree is: $M_{b1} = 0.85 + 0.46 = 1.31$ (i.e., the matching degree of Volkswagen CC);

the second vehicle brand optimal matching degree is: $M_{b2} = 0.26 + 0.46 = 0.72$ (i.e., the matching degree of Volkswagen CC);

the first color optimal matching degree is: $M_{c1} = 0.99 + 0.86 = 1.85$ (i.e., the matching degree of white);

the second color optimal matching degree is: $M_{c2} = 0.99 + 0.86 = 1.85$ (i.e., the matching degree of white);

Suppose the integrated model parameters $\theta_b$, $\theta_c$, and $\delta$ are 1.53, 0.64, and 0.35 respectively, $$M_{f1} = \theta_b M_{b1} \delta + M_{c1} \theta_c = 1.53 * 1.32 * 0.35 + 0.64 * 1.85 = 0.70686 + 1.184 = 1.89086; \text{ and}$$

$$M_{f2} = \theta_b M_{b2} \delta + M_{c2} \theta_c = 1.53 * 0.72 * 0.35 + 0.64 * 1.85 = 0.38556 + 1.184 = 1.56956.$$

As such, the first image which is closer to the target image should be placed at the front of the second image.

Persons skilled in the art should understand that if there are input vehicle images, the input images can be ranked according to the method of this embodiment so as to rank the input images according to similarity to the target image.

This embodiment respectively integrates the vehicle brand and color of the input image and the target image and then compares the integrated results. As to FIG. 9, the calculation amount of comparison and ranking is greatly reduced, and the recognition accuracy is improved.

To further reduce the calculation amount of the recognition method of this disclosure, according to an embodiment, after the vehicle brand recognition region and the color recognition region are recognized by a trained deep learning model, it merely comprises first N vehicle brands or colors and respective scores, and recognition results subsequent to the first N items are omitted. N is 3 to 10, and preferably is 3 to 8, and more preferably is 4 to 6. The inventor found that such omission will not affect the recognition accuracy, but can reduce the calculation amount by 40% or more. With regard to processing data like videos comprising massive images, the simplified method according to this embodiment is advantageous.

Examples for Application Scenarios

Take the example of a traffic policeman searching for unlicensed accident vehicle. When the traffic policeman merely has the image of the accident vehicle and wishes to find the accident vehicle from surveillance videos, the method according to this disclosure can be applied. The accident vehicle image is the target image, and vehicle images obtained from the surveillance video are input images. The method according to this disclosure can be used to recognize the vehicle closest to the accident vehicle from massive surveillance video images.

Figure 11:
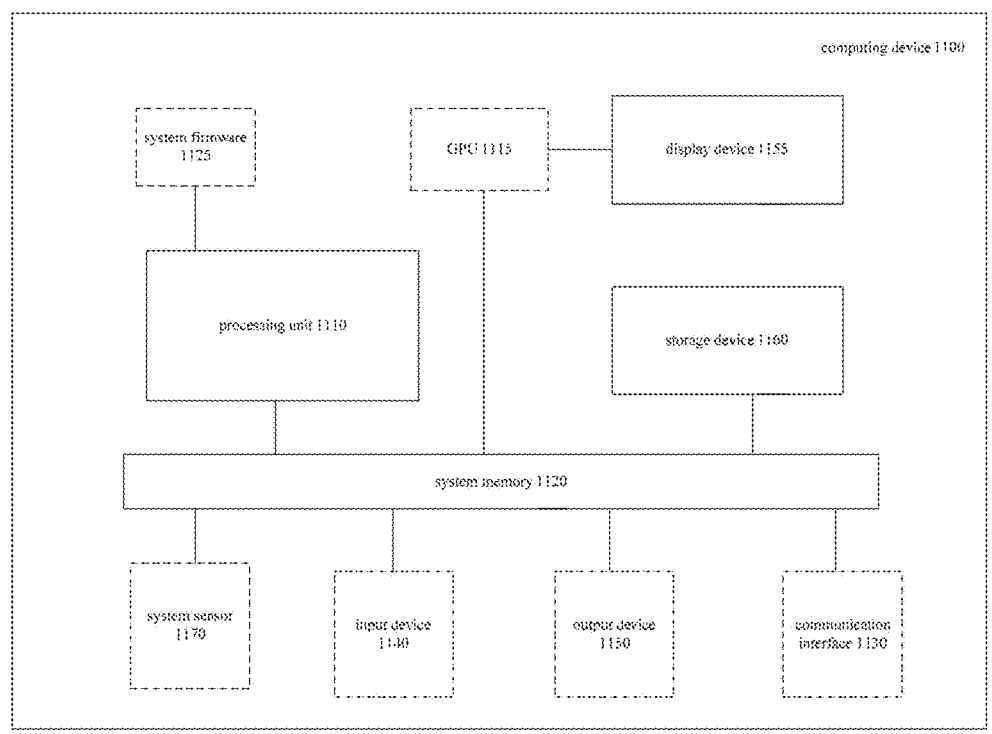
FIG. 11 illustrates a diagram of an exemplary general computer system on which the method and system of this disclosure can be implemented according to an embodiment of this disclosure.

FIG. 11 illustrates a diagram of an exemplary computer system on which the method and system of the present disclosure can be implemented according to an embodiment of this disclosure. The image recognizer described herein is operable in many kinds of general or special computer system environments or configurations. FIG. 11 illustrates an example of general computer system and various implementations and components of the image recognizer described herein can be implemented thereon. It should be noticed that any frame in FIG. 11 shown by break lines or dotted lines represents the alternative part of a calculation device. Furthermore, as described below, any or all of these alternative parts can be combined with other alternative choices described throughout this document to be used together.

For example, FIG. 11 illustrates a computer system diagram. The example of operable device comprising an image recognizer comprises but is not limited to portable electronic device, wearable computing device, handheld computing device, laptop or mobile computer, communication device (such as cell phone, smart phone, and PDA), microprocessor system, microprocessor based system, set top box, programmable consumer electronics, network device, small-size computer, audio or video media player, handheld remote control device, and so on. It should be noted that the image recognizer can be implemented by any touch screen or touch sensitive surface communicating or conforming to various electrical apparatuses or objects.

In order to implement the image recognizer, a computing device 1100 should have enough computing capability and system memory to implement basic computation operation. In addition, the computing device 1100 may comprise one or more sensors, comprising but not limited to accelerometer, camera, capacitive sensor, proximity sensor, microphone, multispectral sensor, and so on. Further, the computing device 1100 may also comprise an optional system firmware 1125 (or other firmware or processor-addressable memory or storing device) used in various implementations of an image recognizer.

As illustrated in FIG. 11, the computing capability of the computing device 1100 usually is illustrated by one or more processing units 1110, and also one or more GPU 1115, one or two of them communicate with a system memory 1120. Please be noted that two or more processing units of the computing device 1100 may be a special microprocessor (such as DSP, VLIW or other microcontroller) or a conventional CPU with one or more processing cores (comprising special G concave based core in multi-core CPU).

In addition, the computing device 1100 may also comprise other components (e.g., a communication interface 1130). The computing device 1100 may also comprise one or more conventional computer input device 1140 or the combination of such devices (such as, touch screen, touch sensitive surface, pointing device, keyboard, audio input device, voice or speech based input and control device, video input device, touch input device, device for receiving wired or wireless data transmission, etc.). The computing device 1100 may also comprise other optional components, such as one or more conventional computer output devices 1150 (e.g., one or more display devices 1155, audio output device, video output device, device for transmitting wired or wireless data transmission, etc.). It should be noted that a general computer's typical computer interface 1130, input device 1140, output device 1150, system sensor 1170, and storage device 1160 are well known for persons skilled in the art, and hence will not be described in detail here.

The computing device 1100 may also comprise various computer-readable medium. The computer-readable medium may be any available media accessed by the storage device 1160, and comprises both of removable and/or non-removable medium and volatile and/or non-volatile medium for information (e.g., computer-readable or computer-executable instruction, data structure, program module, or other data) storage. In an exemplary unlimited way, the computer-readable medium may comprise computer storage medium and communication medium. Computer storage medium refers to tangible computer or machine readable medium or storage device, such as DVD, CD, floppy disk, tape drive, hard disk drive, optical drive, solid state memory device, RAM, ROM, EEPROM, flash memory or other memory technologies, tape cartridge, tape, disk storage device, or other magnetic storage devices, or any other device used for storing expect information and accessed by one or more computing devices.

Information (e.g., computer-readable or computer-executable instruction, data structure, program module, etc.) storage can also be completed by any aforementioned communication medium, encoding two or more modulated data signals or carriers or other transmission mechanism or communication protocol, and comprise any wired or wireless information delivery mechanism. It should be noted that the terminologies "modulated data signal" and "carrier" usually refer to one or more features with concentrated feature or signal changed in the way of encoding information in a signal. For example, communication medium comprises wired medium (e.g., wired network or direct wired connection bearing two or more modulated data signals) and wireless medium (e.g., voice, radio frequency (RF), infrared ray, laser, and other wireless medium for transmitting and/or receiving two or more modulated data signals or carriers). Any combination of the above should be included in the scope of communication medium.

Information (e.g., computer-readable or computer-executable instruction, data structure, program module, etc.) storage can also be completed by any aforementioned communication medium, encoding two or more modulated data signals or carriers or other transmission mechanism or communication protocol, and comprise any wired or wireless information delivery mechanism. It should be noted that the terminologies "modulated data signal" and "carrier" usually refer to one or more features with concentrated feature or signal changed in the way of encoding information in a signal. For example, communication medium comprises wired medium (e.g., wired network or direct wired connection bearing two or more modulated data signals) and wireless medium (e.g., voice, radio frequency (RF), infrared ray, laser, and other wireless medium for transmitting and/or receiving one or more modulated data signals or carriers). Any combination of the above should be included in the scope of communication medium.

Further, any expected combination of computer or machine readable media or storage device and communication media in the form of computer-executable instruction or other data structures stores, receives, transmits or gets back software, program, and/or computer program product implementing some or all or a part of various implementations of the image recognizer described herein.

Finally, the described image recognizer can be described in the context of computer executable instruction (such as program module) implemented by a computing device. Generally, program module comprises routine, program, object, assembly, data structure executing specific task or implementing specific abstract data type. The implementation described herein can also be practiced in a distributed computing environment where task is executed by one or more remote processing devices or in a cloud of one or more devices connected by one or more communication networks. In the distributed computing environment, program module can be located in both the local computer storage media and remote computer storage media including media storage device. Further, the aforementioned instructions can be partly or totally implemented as a hardware logic circuit, which may or may not comprise a processor.

The foregoing embodiments are merely used to illustrate this disclosure and are not to be construed as limiting the disclosure. Persons skilled in the art can make various modifications and variations without departing from the disclosure. Therefore, all the equivalent technical solutions also belong to the scope of this disclosure.

What is claimed is:

1. A method of recognizing a vehicle from an image, comprising:
   receiving, by a computing device, an image;
   recognizing, by a computing device, features of vehicle brand from vehicle brand recognition region extracted from the image with a trained vehicle brand deep learning model;
   recognizing, by a computing device, features of vehicle color from the image;
   recognizing, by a computing device, the features of vehicle color from color recognition region extracted from the image with a trained color deep learning model;
   identifying the vehicle based on a combination of the features of the vehicle brand and the features of vehicle color, wherein the identifying further comprises integrating, by the computing device, the features of the vehicle brand with the features of the vehicle color, and ranking color-vehicle brands; and
   wherein the integrating is based on an integrated model:

$P_f = \theta_b P_b \delta + P_c \theta_c;$ wherein $P_f$ is the score after integrating vehicle color and vehicle brand,
   $P_b$ is the score of the vehicle brand in the features of vehicle brand;
   $P_c$ is the score of the vehicle color in the features of vehicle color; and
   $\theta_b$ and $\theta_c$ are defined by the formula below:

$\theta^* = \arg\max \omega_N(\theta_b P_b \delta + P_c \theta_c);$ wherein arg refers to taking parameters; max refers to maximum value, $\psi_N$ refers to comparison correct rate of top N, $\theta^*$ represents $\theta_b$ and $\theta_c$, $\delta$ is a penalty factor.

2. The method of claim 1, wherein the trained vehicle brand deep learning model is based on convolutional neural network (CNN) model, deep belief network (DBN) model, recurrent neural network (RNN) model, or biological neural network (BNN) model, or combinations thereof.

3. The method of claim 1, wherein the trained color deep learning model is based on convolutional neural network (CNN) model, deep neural network (DNN) model, or a combination thereof.

4. A method of recognizing a vehicle from images, further comprising:
   receiving, by a computing device, a first and a second image;
   recognizing, by a computing device, features of vehicle brand from first and second vehicle brand recognition regions extracted from the first and second images respectively with a trained vehicle brand deep learning model;
   recognizing, by a computing device, features of vehicle color from first and second vehicle color recognition regions extracted from the first and second images respectively with a trained vehicle color deep learning model;
   determining which one in the first and second images is closer to the vehicle indicated by vehicle information;
   integrating, by the computing device, the features of the vehicle brand and the features of vehicle color of the first image;
   integrating, by the computing device, the features of the vehicle brand and the features of vehicle color of the second image; and
   ranking, by the computing device, the first and second images according to integrated features of the vehicle brand and the features of vehicle color of the first and second images with respect to the vehicle information;
   wherein the integrating is based on an integrated model:

$P_f = \theta_b P_b \delta + P_c \theta_c;$ wherein $P_f$ is the score after integrating vehicle color and vehicle brand,
   $P_b$ is the score of the vehicle brand in the features of vehicle brand;
   $P_c$ is the score of the vehicle color in the features of vehicle color; and
   $\theta_b$ and $\theta_c$ are defined by the formula below:

$\theta^* = \arg\max \psi_N(\theta_b P_b \delta + P_c \theta_c);$ wherein arg refers to taking parameters; max refers to maximum value, $\psi N$ refers to comparison correct rate of top N, $\theta^*$ represents $\theta_b$ and $\theta_c$, $\delta$ is a penalty factor.

5. The method of claim 4, wherein the trained vehicle brand deep learning model is based on convolutional neural network (CNN) model, deep belief network (DBN) model, recurrent neural network (RNN) model, or biological neural network (BNN) model, or combinations thereof.

6. The method of claim 4, wherein the trained color deep learning model is based on convolutional neural network (CNN) model, deep neural network (DNN) model, or a combination thereof.

7. The method of claim 4, wherein the ranking comprises sorting based on position and score of the color-vehicle brand indicated by the vehicle information in the integrated features of the vehicle brand and the features of vehicle color of the first and second images.

8. A method of recognizing a vehicle from images, further comprising:

receiving, by a computing device, a first and a second image and a target image;

recognizing, by a computing device, features of vehicle brand from first and second vehicle brand recognition regions extracted from the first and second images respectively with a trained vehicle brand deep learning model;

recognizing, by a computing device, features of vehicle brand from vehicle brand recognition region extracted from the target image with the trained vehicle brand deep learning model;

recognizing, by a computing device, features of vehicle color from first and second vehicle color recognition regions extracted from the first and second images respectively with a trained vehicle color deep learning model;

recognizing, by a computing device, features of vehicle color from color recognition region extracted from the target image with the trained vehicle color deep learning model; and determining, by a computing device, which one in the first and second images is closer to the target image based on similarity of features of vehicle brand and vehicle color of the first and second images to features of vehicle brand and vehicle color of target image;

integrating, by a computing device, the features of vehicle brand of the first image and the features of vehicle brand of the target image to obtain a first vehicle brand optimal matching degree;

integrating, by a computing device, the features of vehicle color of the first image and the features of vehicle color of the target image to obtain a first vehicle brand optimal matching degree;

obtaining, by the computing device, a first optimal matching degree according to the first vehicle brand optimal matching degree and the first color optimal matching degree;

integrating, by a computing device, the features of vehicle brand of the second image and the features of vehicle brand of the target image to obtain a second vehicle brand optimal matching degree;

integrating, by a computing device, the features of vehicle color of the second image and the features of vehicle color of the target image to obtain a second vehicle color optimal matching degree;

obtaining, by a computing device, a second optimal matching degree according to the second vehicle brand optimal matching degree and the second color optimal matching degree; and ranking the first and second images based on the first and the second optimal matching degrees;

wherein the optimal matching degree is calculated as the formula below:

$$M_f = \theta_b M_b \delta + M_c \theta_c;$$

wherein $M_f$ is the optimal matching degree, $M_b$ is the vehicle brand optimal matching degree; $M_c$ is the color optimal matching degree; and the values of $\theta_b$ and $\theta_c$ are defined as follows:

$$\theta^* = \arg\max \psi_N(\theta_b M_b \delta + M_c \theta_c);$$

wherein arg refers to taking parameters; max refers to maximum value, ψN refers to comparison correct rate of top N, $\theta^*$ represents $\theta_b$ and $\theta_c$, δ is a penalty factor.

9. The method of claim 8, wherein the trained vehicle brand deep learning model is based on convolutional neural network (CNN) model, deep belief network (DBN) model, recurrent neural network (RNN) model, or biological neural network (BNN) model, or combinations thereof.

10. The method of claim 8, wherein the trained color deep learning model is based on convolutional neural network (CNN) model, deep neural network (DNN) model, or a combination thereof.

11. A computer storage device having computer-executable instructions that, when executed by at least one processor, cause the at least one processor to perform any method of recognizing a vehicle from an image or images according to any of the above method claims by a computing device.

12. A system comprising: a processor and memory; an operating environment executing using the processor; a display; wherein the processor is configured to perform any method of recognizing a vehicle from an image or images according to any of the above method claims by a computing device.

* * * * *